(12) United States Patent
    Varennes

(10) Patent No.: US 12,584,487 B2
(45) Date of Patent: Mar. 24, 2026

(54) TURBOMOLECULAR VACUUM PUMP AND METHODS FOR MANUFACTURING A ROTOR

(71) Applicant: PFEIFFER VACUUM, Annecy (FR)

(72) Inventor: Nicolas Varennes, Annecy (FR)

(73) Assignee: PFEIFFER VACUUM, Annecy (FR)

( * ) Notice: Subject to any disclaimer, the term of this patent is extended or adjusted under 35 U.S.C. 154(b) by 0 days.

(21) Appl. No.: 18/881,063

(22) PCT Filed: Apr. 25, 2023

(86) PCT No.: PCT/EP2023/060724
    § 371 (c)(1),
    (2) Date: Jan. 3, 2025

(87) PCT Pub. No.: WO2024/008348
    PCT Pub. Date: Jan. 11, 2024

(65) Prior Publication Data
    US 2026/0002541 A1      Jan. 1, 2026

(30) Foreign Application Priority Data

Jul. 7, 2022    (FR) ...................................... 2206931

(51) Int. Cl.
    *F04D 19/04*      (2006.01)
    *B33Y 80/00*      (2015.01)
    *F04D 29/02*      (2006.01)
    *F04D 29/38*      (2006.01)
(52) U.S. Cl.
    CPC ......... *F04D 19/042* (2013.01); *F04D 29/023* (2013.01); *F04D 29/384* (2013.01); *B33Y 80/00* (2014.12); *F05D 2240/301* (2013.01)

(58) Field of Classification Search
    CPC .... F04D 19/042; F04D 29/023; F04D 29/384; B33Y 80/00; F05D 2240/301
    See application file for complete search history.

(56) References Cited

U.S. PATENT DOCUMENTS

| | | | | |
|---|---|---|---|---|
| 2005/0169745 A1* | 8/2005 | Conrad | ................. | F04D 29/057 |
| | | | | 415/90 |
| 2007/0104598 A1* | 5/2007 | Varennes | ............ | F04D 27/0292 |
| | | | | 417/423.4 |
| 2009/0246038 A1* | 10/2009 | Kawasaki | ............. | F04D 17/168 |
| | | | | 417/203 |

(Continued)

FOREIGN PATENT DOCUMENTS

| | | | | |
|---|---|---|---|---|
| EP | 3085964 A1 * | 10/2016 | ............. | B33Y 80/00 |
| GB | 2568066 A1 | 5/2019 | | |
| JP | H11230084 A * | 8/1999 | | |

OTHER PUBLICATIONS

JPH11230084 English translation (Year: 2025).*
International Search Report and Written Opinion issued on Jul. 27, 2023, in PCT/EP2023/060724 filed on Apr. 25, 2023, 9 pages.

*Primary Examiner* — Dominick L Plakkoottam
(74) *Attorney, Agent, or Firm* — Oblon, McClelland, Maier & Neustadt, L.L.P.

(57)      ABSTRACT

A turbomolecular vacuum pump including a stator and a rotor designed to rotate in the stator. The rotor includes a hub and at least one blade stage including blades distributed regularly about the periphery of the hub. The blades of at least one blade stage of the rotor are hollow.

13 Claims, 7 Drawing Sheets

(56)         References Cited

U.S. PATENT DOCUMENTS

| | | | |
|---|---|---|---|
| 2013/0039744 A1* | 2/2013 | Woody | F04D 23/00 |
| | | | 416/223 R |
| 2020/0058479 A1 | 2/2020 | Steiner et al. | |
| 2020/0378857 A1* | 12/2020 | Manabe | F04D 19/046 |
| 2021/0010378 A1* | 1/2021 | Schmitt | C23C 16/517 |

* cited by examiner

TURBOMOLECULAR VACUUM PUMP AND METHODS FOR MANUFACTURING A ROTOR

The present invention relates to a turbomolecular vacuum pump. The present invention also relates to methods for manufacturing a rotor of a turbomolecular vacuum pump.

The generation of a high vacuum in an enclosure requires the use of turbomolecular vacuum pumps comprising a stator in which a rotor is driven in rapid rotation, for example at more than 30,000 revolutions per minute.

In some applications of such vacuum pumps, notably in the semiconductor manufacturing industry, continuous efforts are made to increase the pumping rate, which results in larger and larger pumps, and to increase the operating temperatures of the vacuum pumps to avoid the deposition of reaction by-products in the pumps and thus to ensure suitable service lives and to increase the productivity of the production equipment.

However, the increased volume of vacuum pumps can create problems relating to raw material supply.

Large vacuum pumps can also take up too much space, making it difficult to fit said pumps underneath process chambers, where there are usually already a large number of accessories required to operate the equipment.

Some processes, notably in the semiconductor manufacturing industry, are using new and more complex chemistries that generate increasingly large quantities of by-products, which can be deposited in the vacuum pump if said vacuum pump is not sufficiently heated. The temperatures of turbomolecular vacuum pumps set to 50° C. to 60° C. a few decades ago, now need to be set to approximately 150° C.

The rotors of modern turbomolecular vacuum pumps are usually made of a high-performance aluminium alloy, which has provided optimum creep resistance to date. This solution provides a good compromise between the vacuum performance obtained in terms of rotational speed of the pump and the kinetic inertia stored in the pump. Indeed, in the event of damage being caused to the rotor, all the kinetic rotational energy of the rotor can be contained inside the vacuum pump casing to ensure the safety of people and property. However, it is not possible to exceed a certain heating temperature of the turbomolecular vacuum pump under stress, notably 150° C., without the risk of creep in the rotor. It is also difficult to cool the rotor, as said rotor is usually on magnetic bearings and therefore not in contact with the stator.

One of the objectives of the present invention is to provide a turbomolecular vacuum pump that at least partially solves a drawback of the prior art, notably enabling the kinetic energy stored in the vacuum pump to be reduced. Another objective of the present invention is to increase the pumping rate and/or operating temperature of the turbomolecular vacuum pump without increasing the volume of the vacuum pump.

For this purpose, the invention relates to a turbomolecular vacuum pump comprising a stator and a rotor designed to rotate in the stator, the rotor comprising a hub and at least one blade stage comprising blades distributed regularly about the periphery of the hub, characterized in that the blades of at least one blade stage of the rotor are hollow.

Only the outer surfaces of the rotor are required to pump the gases, so a partially hollow rotor does not affect pumping performance. On the other hand, hollow blades reduce the weight of the rotor, which allows the kinetic energy stored in the vacuum pump to be reduced so that the rotor can be contained within the casing of the vacuum pump in the event of an explosion. This enables the rotor to be made at least partially of an alloy that has a greater density than aluminium alloys, thereby providing better creep resistance.

The vacuum pump can also have one or more of the features described below, taken individually or in combination.

The rotor for example has more than four blade stages, the first blade stage, positioned on the side of a suction orifice of the vacuum pump, having hollow blades.

The thickness of the skin of the hollow blades is for example equal to or less than 3 mm and/or equal to or greater than 0.2 mm.

The diameter of the rotor is for example equal to or greater than 160 mm and/or equal to or less than 450 mm.

The rotor can have a cylindrical skirt downstream of the at least one blade stage, the cylindrical skirt being hollow.

The hollow cylindrical skirt may have internal reinforcing elements, connecting the walls facing each other in the cavity of the cylindrical skirt.

The hub can also be hollow.

The rotor can be made at least partially of an alloy with a greater density than aluminium alloys, i.e. greater than 2.7 g/cm$^3$.

The rotor is for example made at least partially of stainless steel or titanium alloy or nickel-based alloy.

These alloys have a greater density than aluminium alloys. These alloys are in the order of two to three times heavier. The high density of these alloys provides excellent mechanical strength and better creep resistance at high temperature than aluminium alloy. These alloys also have good resistance to corrosion and oxidation.

These materials for example enable the turbomolecular vacuum pump to be heated to higher temperatures without the risk of creep. These materials also allow the gas flow rate of the turbomolecular vacuum pump to be increased without the risk of creep in the rotor. These materials can also allow the rotor to rotate faster than a vacuum pump in the prior art of the same size, thereby increasing the pumping rate without the risk of creep in the rotor. The use of these materials can also reduce the size of the vacuum pump with a higher rotational speed of the rotor and therefore the same pumping performance without the risk of creep in the rotor.

These alloys are more expensive and heavier than aluminium alloys, but a rotor with at least one blade stage with hollow blades reduces the weight of the rotor, which reduces the kinetic energy in event of an explosion of the rotor, and reduces the raw material used, reducing raw material costs and helping to mitigate potential supply problems.

The at least one blade stage of the rotor with hollow blades can be made by metal additive manufacturing. Stainless steels, titanium alloys and nickel-based alloys are particularly well suited to metal additive manufacturing, notably by laser melting.

The radial ends of the hollow blades made by metal additive manufacturing are for example open.

The hollow cylindrical skirt can also be made by metal additive manufacturing. The annular end of the skirt made by metal additive manufacturing is for example open.

The rotor can be made in one piece.

The rotor can be made by interference-fitting at least one blade stage with hollow blades made by metal additive manufacturing onto the hub.

The rotor can be made by metal additive manufacturing of at least one blade stage with hollow blades on the hub.

The present invention also relates to a manufacturing method for a rotor of a turbomolecular vacuum pump as described above, in which the rotor is made entirely by metal additive manufacturing.

The present invention also relates to a manufacturing method for a rotor of a turbomolecular vacuum pump as described above, in which at least one blade stage with hollow blades is made by metal additive manufacturing and interference fitted to the hub.

The hollow cylindrical skirt can also be made by metal additive manufacturing and interference fitted to the hub.

The present invention also relates to a manufacturing method for a rotor of a turbomolecular vacuum pump as described above, in which at least the one blade stage with hollow blades is made by metal additive manufacturing on the hub.

The hollow cylindrical skirt can also be made by metal additive manufacturing on the hub.

DESCRIPTION OF THE DRAWINGS

Other advantages and features are included in the description of a specific embodiment of the invention, which is in no way limiting, and in the attached drawings, in which:

FIG. 3 is a cross-section view of the rotor in FIG. 2A.

FIG. 4 is a cross-section view of a turbomolecular vacuum pump rotor according to a second embodiment.

FIG. 5 is a cross-section view of a turbomolecular vacuum pump rotor according to a third embodiment.

In these figures, identical elements are indicated using same reference numbers.

The following embodiments are examples. Although the description refers to one or more embodiments, this does not necessarily mean that each reference sign refers to the same embodiment, or that the features apply only to one embodiment. Individual features of different embodiments may also be combined or swapped to provide other embodiments.

"Upstream" means an element that is placed before another element in relation to the flow direction of the pumped gases. Conversely, "downstream" means an element that is placed after another element in relation to the flow direction of the pumped gases.

Axial refers to the direction parallel to the rotation axis I-I of the rotor of the vacuum pump, and radial refers to the directions perpendicular to the axial direction.

Figure 1:
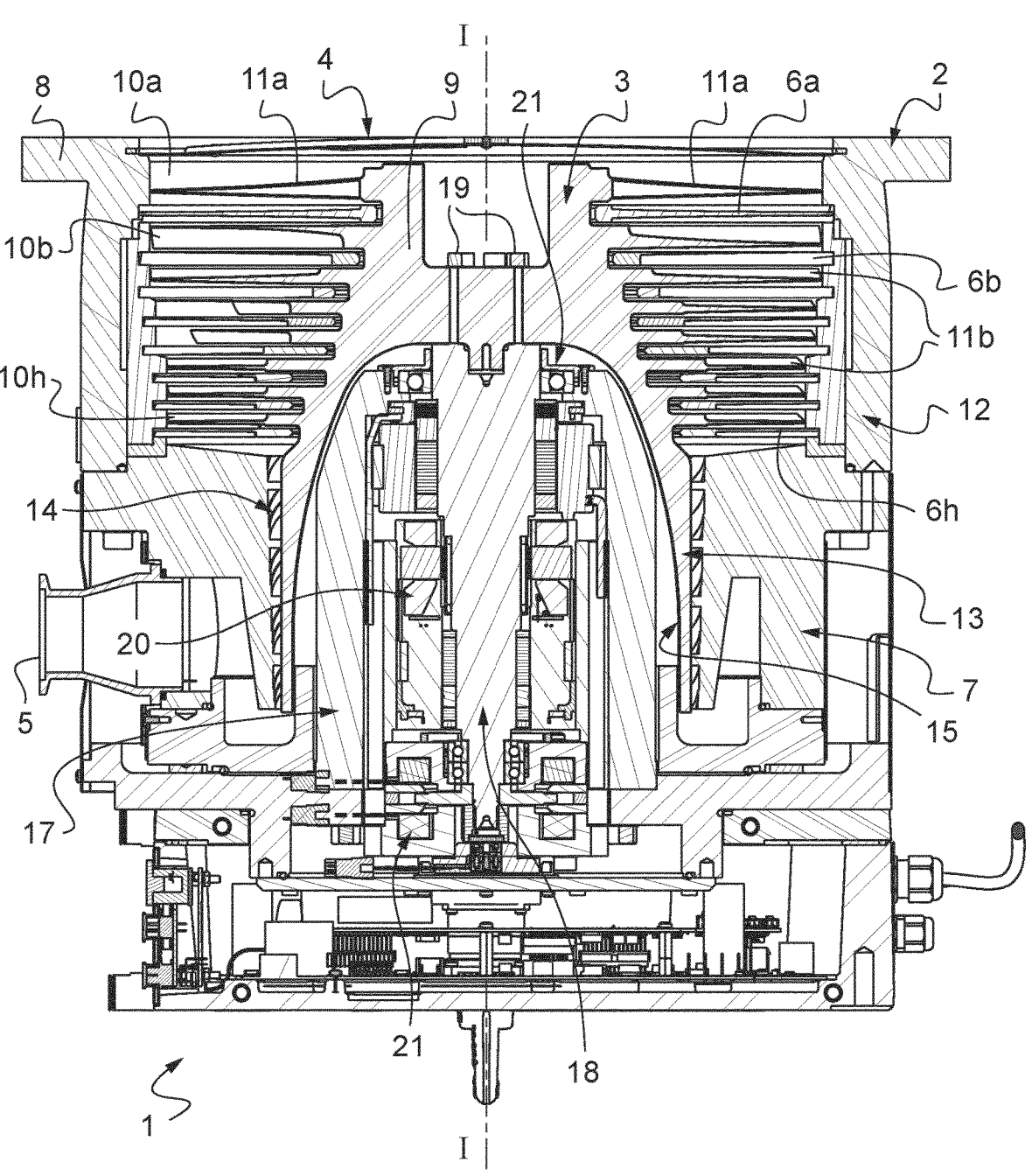
FIG. 1 is an axial cross-section view of a turbomolecular vacuum pump according to a first embodiment.

FIG. 1 shows a first example embodiment of a turbomolecular vacuum pump 1.

The turbomolecular vacuum pump 1 comprises a stator 2 in which a rotor 3 is arranged to turn at high speed in axial rotation, for example rotation at more than 20,000 revolutions per minute.

The pumped gases enter through a suction orifice 4 and are discharged through a discharge orifice 5 of the turbomolecular vacuum pump 1. In operation, the discharge orifice 5 is connected to a rough pump.

The stator 2 notably comprises a casing 12, for example assembled in several parts, at least two annular stator stages 6a-6h fastened to the casing 12, and in this case a high-pressure socket 7 that is fastened to the casing 12 and in which the discharge orifice 5 of the vacuum pump 1 is arranged.

The stator 2 includes an annular inlet flange 8 surrounding the suction orifice 4 to connect the vacuum pump 1 to an enclosure in which the pressure is to be reduced.

Figure 2A:
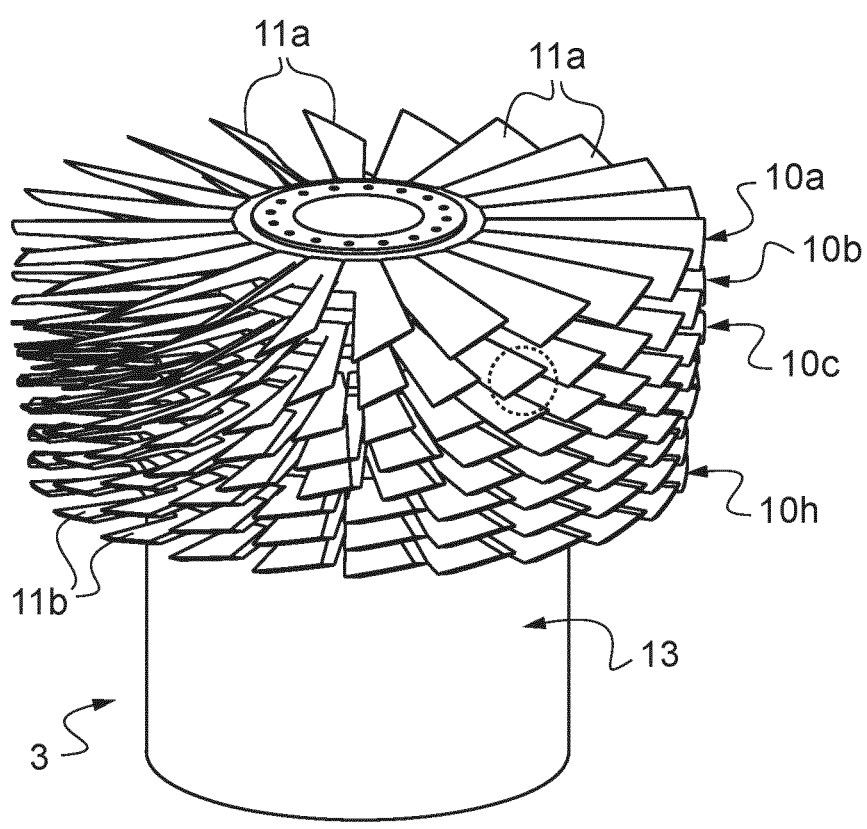
FIG. 2A is a perspective view of the rotor of the vacuum pump in FIG. 1.
Figure 3:
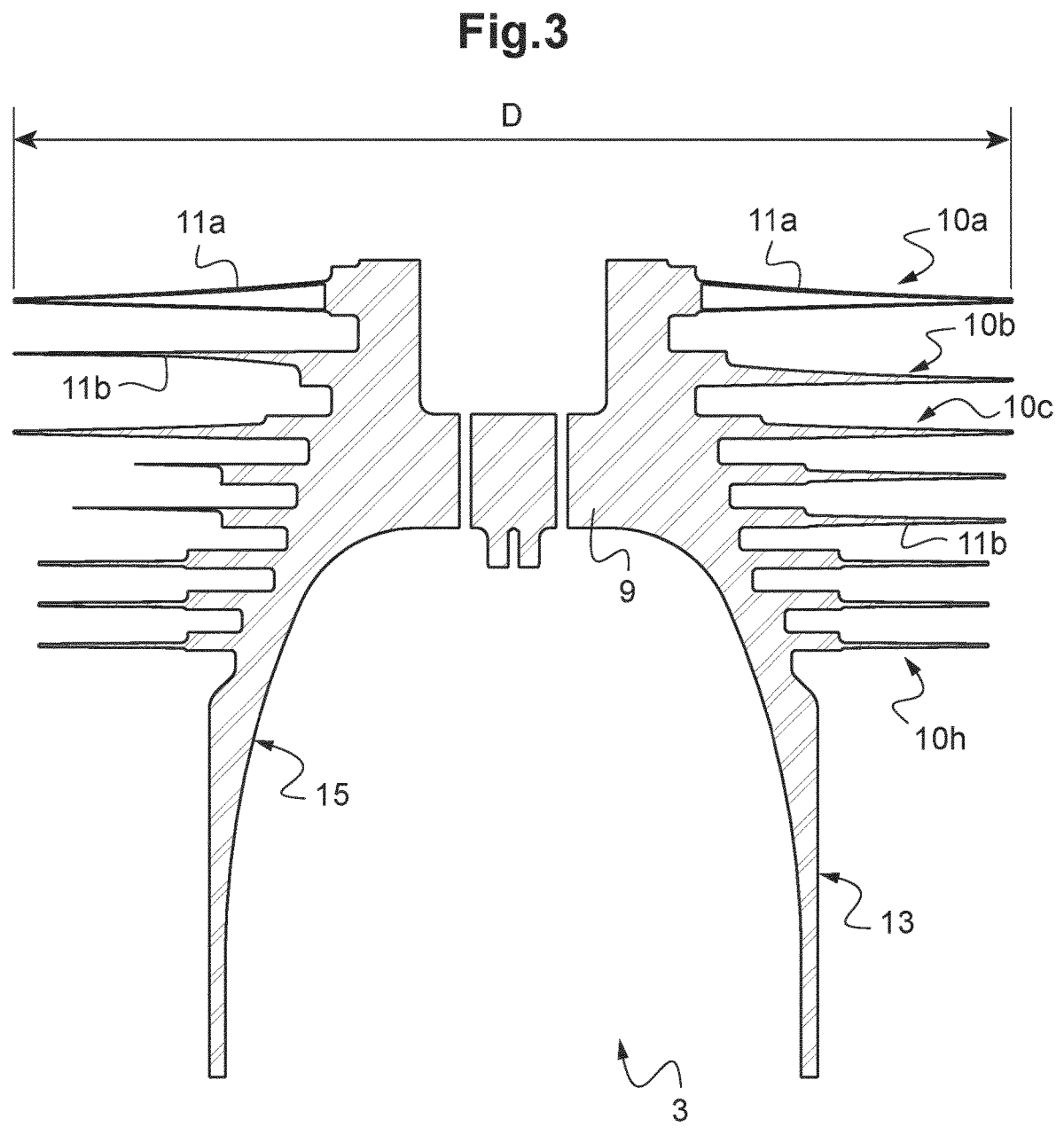

As shown clearly in FIGS. 2A and 3, the rotor 3 has a hub 9 and at least one blade stage 10a-10h. Each blade stage 10a-10h comprises blades 11a, 11b that extend substantially radially from the hub 9 at an angle and that are evenly distributed about the periphery of the hub 9. Each blade stage 10a-10h has respectively, for example, between twenty and thirty blades 11a, 11b, in this case twenty-two blades.

The rotor 3 has, for example, more than four blade stages 10a-10h, for example between four and twelve blade stages 10a-10h (eight in the example shown in the figures). The first blade stage 10a is the one located on the side of the suction orifice 4 of the turbomolecular vacuum pump 1.

The annular stator stages 6a-6h of the stator 2 are respectively arranged between the successive blade stages 10a-10h of the rotor 3. The annular stator stages 6a-6h and the blade stages 10a-10h succeed each other axially along the rotational axis I-I of the rotor 3 (FIG. 1).

The rotor 3 can have a cylindrical skirt 13, referred to as a Holweck skirt, downstream of the at least two blade stages 10a-10h, formed by a smooth cylinder, which rotates opposite helical grooves 14 in the stator 2. The helical grooves 14 in the stator 2 help to compress and guide the pumped gases to the discharge orifice 5.

The rotor 3 also has an internal bowl 15 under the cylindrical skirt 13 that is coaxial to the rotation axis I-I and arranged opposite a bell 17 of the stator 2, projecting beneath the rotor 3. In operation, the rotor 3 rotates in the stator 2 with no contact between the internal bowl 15 and the bell 17.

The rotor 3 is fastened to a drive shaft 18 of the vacuum pump 1, for example by means of screws 19 passing through the hub 9 of the rotor 3. The rotor 3 is driven in rotation in the stator 2 by an internal motor 20 of the vacuum pump 1. The motor 20 is for example arranged in the bell 17 of the stator 2, which is in turn arranged beneath the internal bowl 15 of the rotor 3, with the drive shaft 18 passing through the bell 17 of the stator 2.

The rotor 3 is guided laterally and axially by magnetic and/or mechanical bearings 21 supporting the drive shaft 18 of the rotor 3, located in the stator 2. For example, first bearings 21 support and guide a first end of the drive shaft 18 in a base of the bell 17 of the stator 2, and second bearings 21 support and guide a second end of the drive shaft 18 arranged at the top of the bell 17.

Other electrical or electronic components can be housed in the bell 17 of the stator 2, such as position sensors.

The vacuum pump 1 may include a heating device designed to heat the stator 2. The heating device may comprise an external resistive heating belt designed to heat the casing 12 of the vacuum pump 1 or radiative elements arranged in the gas flow path of the vacuum pump 1, for example designed to heat the high-pressure socket 7 of the stator 2 in which the helical grooves 14 are formed.

As shown in the cross-section view in FIG. 3, the blades 11a of at least one blade stage 10a of the rotor 3 are hollow.

The cavities of the hollow blades 11a for example extend inside all of the respective blades 11a. All of the blades 11a of the respective blade stage 10a are hollow. The thickness e of the skin of the hollow blades 11a (FIG. 2B) is for example equal to or less than 3 mm (maximum thickness over the entire length of the cavity of the blade 11a) and/or equal to or greater than 0.2 mm (minimum thickness over the entire length of the cavity of the blade 11a).

Only the outer surfaces of the rotor 3 are required to pump the gases, so a partially hollow rotor 3 does not affect pumping performance. On the other hand, hollow blades 11*a* reduce the weight of the rotor 3, which allows the kinetic energy stored in the vacuum pump 1 to be reduced so that the rotor 3 can be contained within the casing 12 of the vacuum pump 1 in the event of an explosion.

In the first example embodiment shown in FIGS. 1 to 3, only the blades 11*a* of one blade stage 10*a* of the rotor 3 are hollow, and in particular only the first blade stage 10*a*, located on the side of the suction orifice 4 has hollow blades 11*a*. This is the blade stage 10*a* of the rotor 3 with the largest blades 11*a*, therefore providing the greatest weight and material savings. The blades 11*b* of the other blade stages 10*b*-10*h* are solid.

The blade stage with the hollow blades 11*a* can however be another stage of the rotor 3.

Furthermore, the rotor 3 can be made at least partially of an alloy with a greater density than aluminium alloys, i.e. greater than 2.7 g/cm³.

The rotor 3 is for example at least partially made of stainless steel or of a titanium alloy or a nickel-based alloy, also known as a superalloy, such as Inconel® 600 (NiCr15Fe), Inconel® 625 (NiCr22Mo9Nb) or Inconel® 718 (NiCr19Fe19Nb5Mo3). The secondary alloying metals in Inconel® are primarily niobium, manganese and molybdenum.

These alloys have a greater density than aluminium alloys. These alloys are in the order of two to three times heavier. The high density of these alloys provides excellent mechanical strength and better creep resistance at high temperatures than aluminium alloy. These alloys also have good resistance to corrosion and oxidation.

These materials for example enable the turbomolecular vacuum pump 1 to be heated to higher temperatures without the risk of creep. For example, the heating device may be configured to heat the stator 2 to a temperature equal to or greater than 150° C., such as 200° C., thereby preventing the formation of reaction product deposits in the vacuum pump 1, notably in semiconductor manufacturing applications.

These materials also allow the gas flow rate of the turbomolecular vacuum pump 1 to be increased without the risk of creep in the rotor 3.

These materials can also allow the rotor 3 to rotate faster than a vacuum pump 1 in the prior art of the same size, thereby increasing the pumping rate without the risk of creep in the rotor 3. The rotational speed of the rotor 3 is for example equal to or greater than 20,000 rpm. The diameter D of the rotor 3, in which the radial ends of the blades 11*a*, 11*b* are inscribed, is for example equal to or greater than 160 mm and/or equal to or less than 450 mm (FIG. 3).

The use of these materials can also reduce the size of the vacuum pump 1 with a higher rotational speed of the rotor 3 and therefore the same pumping performance without the risk of creep in the rotor 3.

These alloys are more expensive and heavier than aluminium alloys, but a rotor 3 with at least one blade stage 10*a* with hollow blades 11*a* reduces the weight of the rotor 3, which reduces the kinetic energy in event of an explosion of the rotor 3, and reduces the raw material used, thereby reducing raw material costs and helping to mitigate potential supply problems.

The rotor 3 is for example made in one piece.

All or part of the rotor 3 can be made by metal additive manufacturing from the constituent metal, such as stainless steel, titanium alloy or nickel alloy, for example by laser melting or electron beam melting.

In the laser melting process, such as the direct energy deposition (DED) process, also known as direct metal deposition (DMD), the constituent metal in the form of metal powder is deposited and then melted by laser beam and fused with the previous layer.

In the electron beam melting process, such as electron beam additive manufacturing (EBAM), an electron beam melts the constituent metal in the form of thick wires to make a 3D print.

Stainless steels, titanium alloys and nickel-based alloys are particularly well suited to metal additive manufacturing, notably by laser melting.

At least one blade stage 10*a* of the rotor 3 with hollow blades 11*a* is made by metal additive manufacturing.

In the first embodiment where the rotor 3 is made in one piece, the rotor 3 can be made entirely by metal additive manufacturing.

Figure 2B:
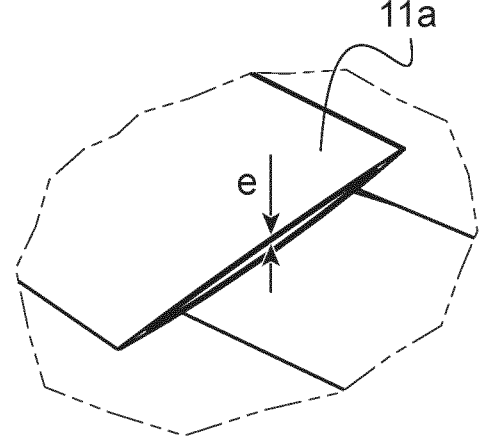
FIG. 2B is a detailed view of the rotor in FIG. 2A.

The radial ends of the hollow blades 11*a* made by metal additive manufacturing, in this case the blades in the first blade stage 10*a*, can be open, which is simpler to make (FIG. 2B).

The rotor 3 can also be coated after manufacture, notably to improve corrosion resistance. For example, the rotor has a nickel-plated coating.

Although only one blade stage 10*a* has hollow blades 11*a* in the first embodiment, the turbomolecular vacuum pump 1 may have several blade stages with hollow blades.

For example, the turbomolecular vacuum pump 1 has two blade stages with hollow blades. These stages are not necessarily consecutive in the gas pumping path. For example, as shown in FIG. 4, the first blade stage 10*a* on the side of the suction orifice 4 and the sixth blade stage 10*f* have hollow blades 11*a*.

The turbomolecular vacuum pump 1 may also have more than two blade stages with hollow blades. For example, as shown in FIG. 5, the first, third and sixth blade stages 10*a*, 10*c*, 10*f* have hollow blades 11*a*.

Figure 7:
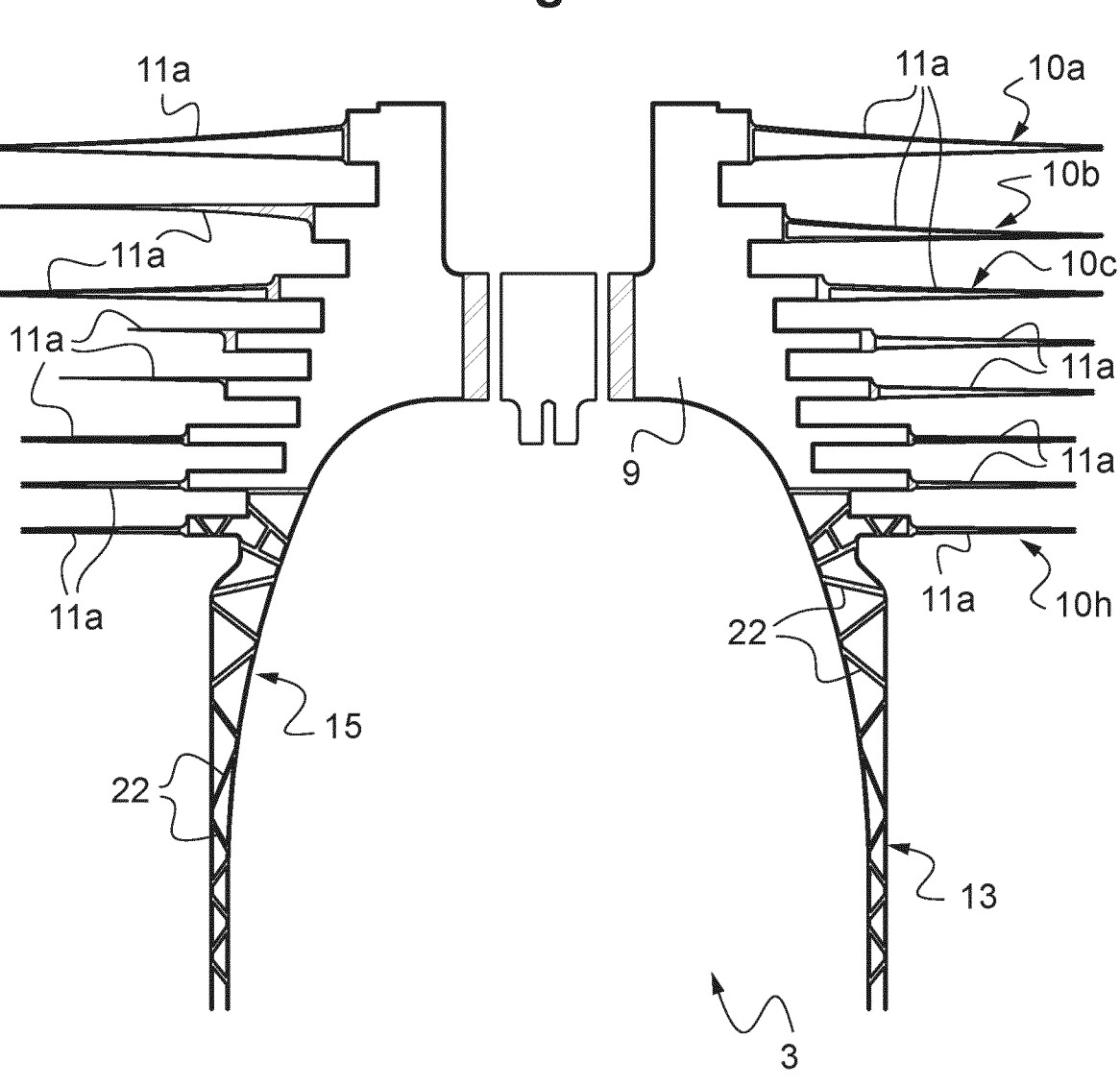
FIG. 7 is a cross-section view of a turbomolecular vacuum pump rotor according to a fifth embodiment.

Equally, all of the blades 11*a* of all of the blade stages 10*a*-10*h* of the rotor 3 may also be hollow (FIG. 7).

Figure 4:
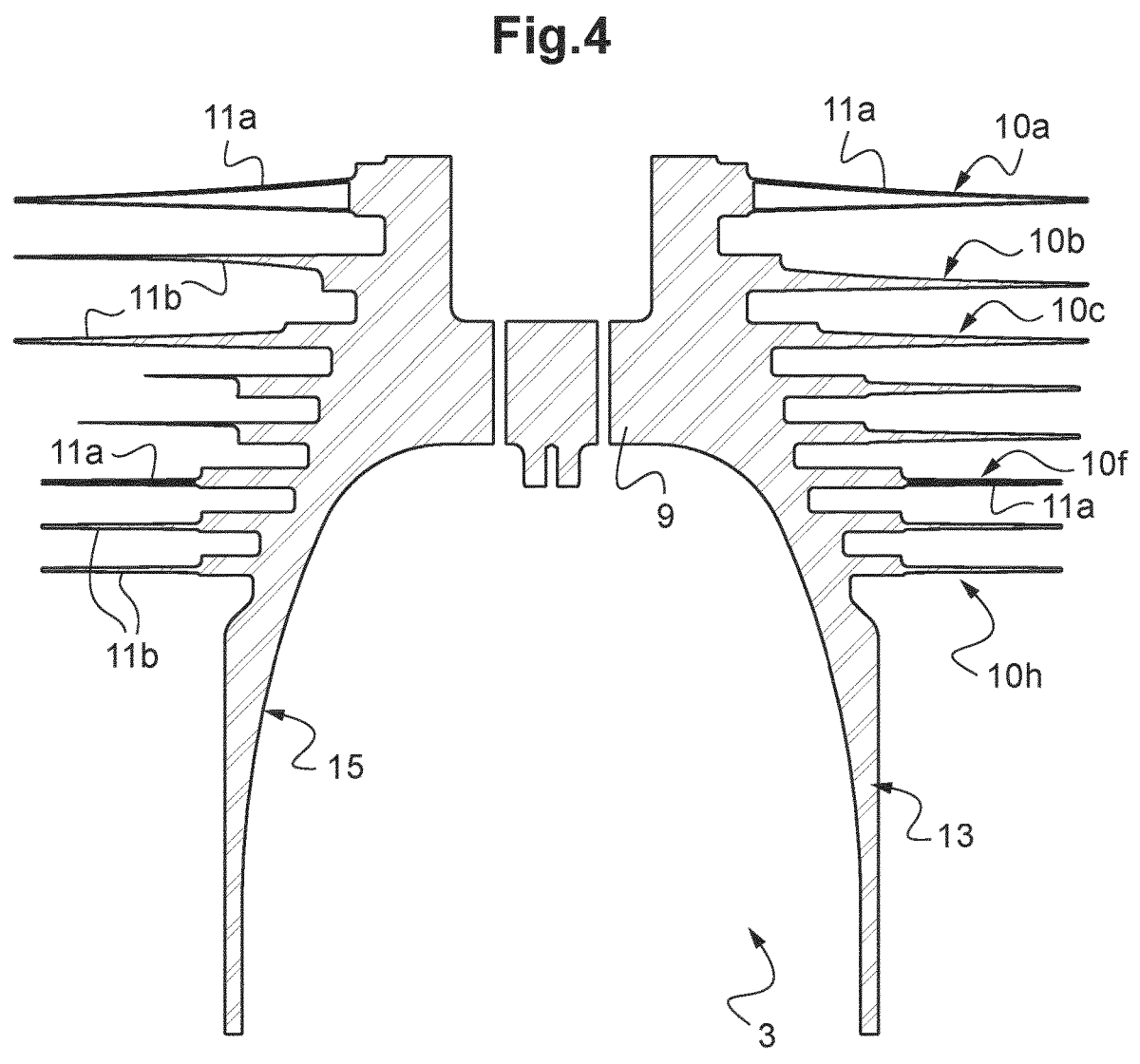
Figure 5:
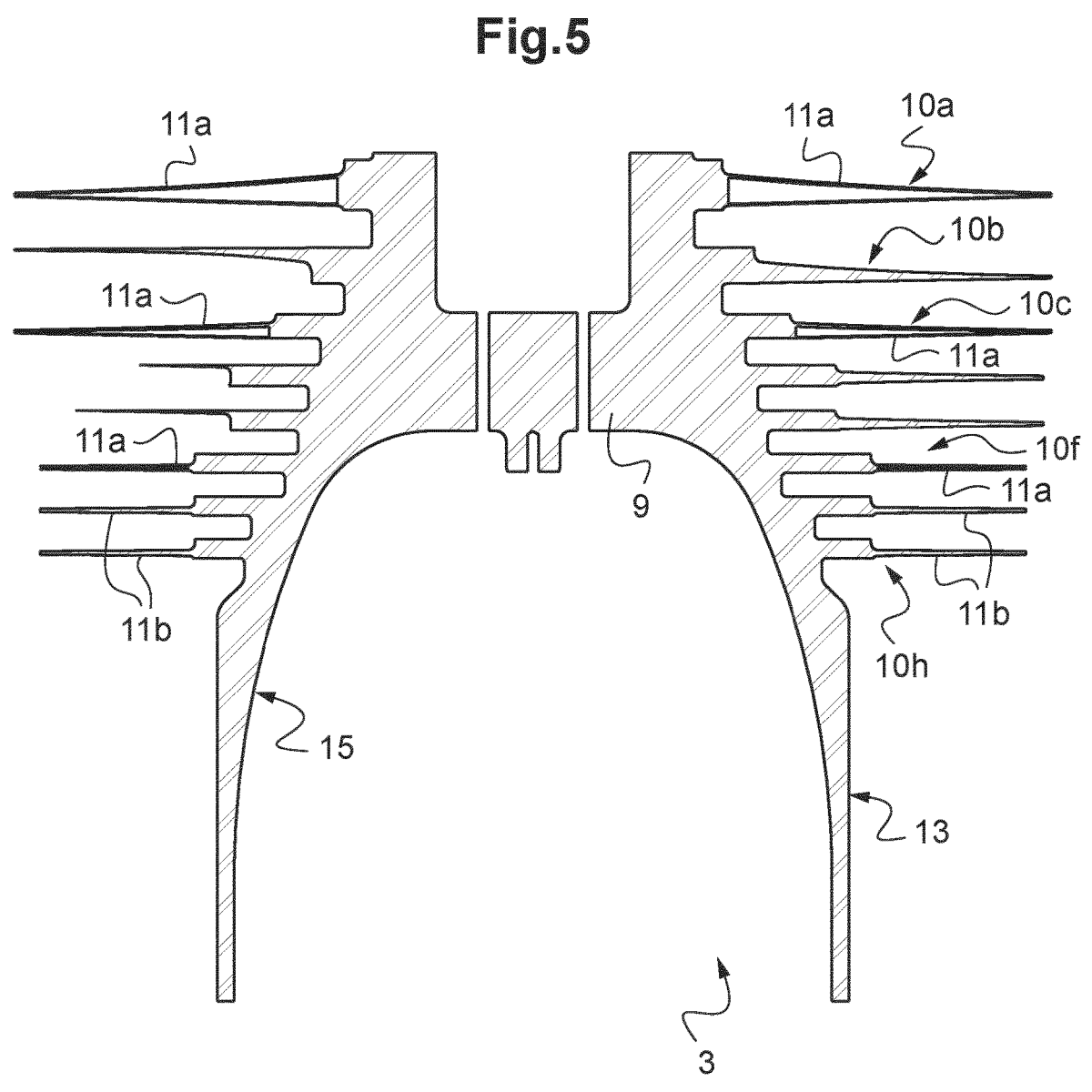

The ends of the blades 11*a* of the blade stages made by metal additive manufacturing, the first and sixth blade stages 10*a*, 10*f* in FIG. 4 or the first, third and sixth blade stages 10*a*, 10*c*, 10*f* in FIG. 5, or all of the blade stages 10*a*-10*h* in FIG. 7, can be open.

Figure 6:
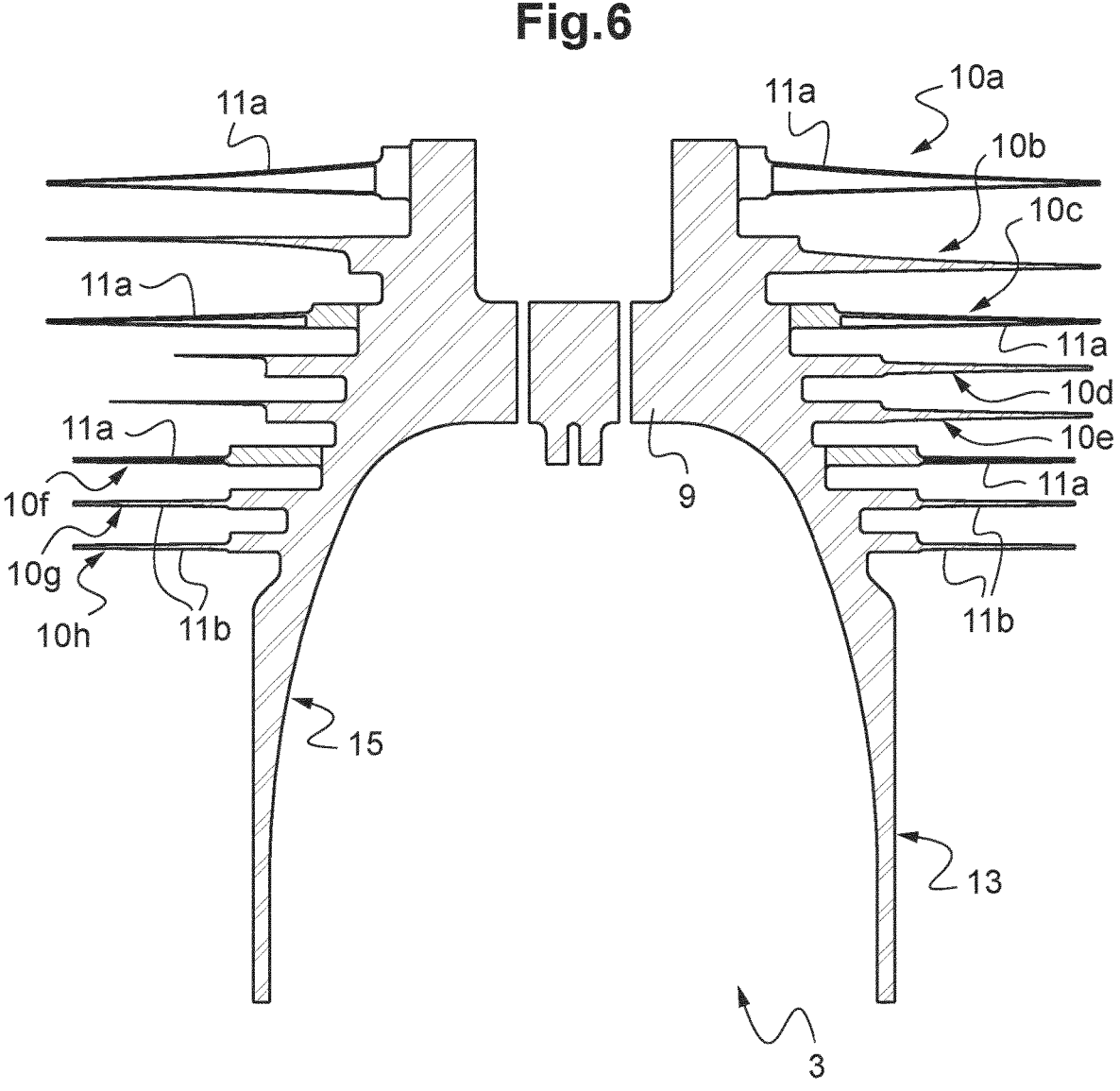
FIG. 6 is a cross-section view of a turbomolecular vacuum pump rotor according to a fourth embodiment.

FIG. 6 shows another example embodiment.

In this example, the rotor 3 is made by assembling several parts, firstly the hub 9 in this case made integral with the cylindrical skirt 13 and the blade stages with solid blades 11*b*, in this case the second, fourth, fifth, seventh and eighth stages 10*b*, 10*d*, 10*e*, 10*g* and 10*h*, and secondly at least one blade stage with hollow blades 11*a*, in this case the first, third and sixth blade stages 10*a*, 10*c*, 10*f*.

The different parts can be made of the same material or different materials.

During the manufacture of the rotor 3, the hub 9, and in this case the cylindrical skirt 13 and the blade stages 10*b*, 10*d*, 10*e*, 10*g* and 10*h* with solid blades 11*b*, can be manufactured in a conventional way, for example by turning.

According to a first variant of the assembly of several parts, the rotor 3 is made by interference fitting at least one blade stage with hollow blades 11*a* onto the hub 9, in this case the first, third and sixth blade stages 10*a*, 10*c*, 10*f*, these blade stages 10*a*, 10*c*, 10*f* being made by metal additive manufacturing.

According to a second variant of the assembly of several parts, the rotor 3 is made by metal additive manufacturing of at least one blade stage with hollow blades 11a on the hub 9. In other words, the at least one blade stage with hollow blades 11a, in this case the first, third and sixth blade stages 10a, 10c, 10f, are added by metal additive manufacturing to the hub 9.

In both variants, the ends of the hollow blades 11a made by metal additive manufacturing, in this case the ends of the blades of the first, third and sixth blade stages 10a, 10c, 10f, can be open.

Other features of the example embodiments in FIGS. 4 to 6 are similar to the first example embodiment described.

In the example embodiment shown in FIG. 7, all of the blade stages 10a-10h have hollow blades 11a.

The cylindrical skirt 13 is also hollow in this embodiment.

The hollow cylindrical skirt 13 may have internal reinforcing elements 22, connecting the walls facing each other in the cavity of the cylindrical skirt 13, to increase the mechanical strength thereof.

The hub 9 is also hollow in this embodiment.

Other arrangements are possible, for example some blade stages can have solid blades 11b or the cylindrical skirt 13 or the hub 9 can be solid.

During manufacture of the rotor 3, the hub 9 can be manufactured conventionally or by additive manufacturing.

The rotor 3 can be made by interference-fitting at least one blade stage with hollow blades 11a made by metal additive manufacturing onto the hub 9, in this case all of the blade stages 10a-10h, and/or by interference-fitting the hollow cylindrical skirt 13 onto the hub 9.

The rotor 3 can also be made by metal additive manufacturing of at least one blade stage 10a-10h with hollow blades 11a, in this case all of the blade stages 10a-10h, and/or the hollow cylindrical skirt 13, on the hub 9. In other words, the at least one blade stage 10a-10h with hollow blades 11a and/or the cylindrical skirt 13 are added by metal additive manufacturing to the hub 9.

It is also possible to interference-fit at least one blade stage 10a-10h, with hollow blades 11a made by metallic additive manufacturing, onto the hub 9, and to add the hollow skirt to the hub 9 by metal additive manufacturing on the hub 9.

In all variants, the ends of the hollow blades 11a and of the cylindrical skirt 13 made by metal additive manufacturing may be open.

The invention claimed is:

1. A turbomolecular vacuum pump, comprising:
   a stator and a rotor configured to rotate in the stator, the rotor comprising a hub and at least one blade stage comprising blades distributed regularly about the periphery of the hub,
   wherein the blades of at least one blade stage of the rotor are hollow, wherein the at least one blade stage of the rotor with hollow blades is made by metal additive manufacturing, and
   wherein radial ends of the hollow blades made by metal additive manufacturing are open.

2. The turbomolecular vacuum pump according to claim 1, wherein the rotor has more than four blade stages, the first blade stage, positioned on the side of a suction orifice of the vacuum pump, having hollow blades.

3. The turbomolecular vacuum pump according to claim 1, wherein a thickness of a respective skin of each of the hollow blades is equal to or less than 3 mm and equal to or greater than 0.2 mm.

4. The turbomolecular vacuum pump according to claim 1, wherein a diameter of the rotor is equal to or greater than 160 mm and equal to or less than 450 mm.

5. The turbomolecular vacuum pump according to claim 1, wherein the rotor has a cylindrical skirt downstream of the at least one blade stage, the cylindrical skirt being hollow.

6. The turbomolecular vacuum pump according to claim 5, wherein the hollow cylindrical skirt has internal reinforcing elements that connect walls facing each other in a cavity of the cylindrical skirt.

7. The turbomolecular vacuum pump according to claim 1, wherein the hub is also hollow.

8. The turbomolecular vacuum pump according to claim 1, wherein the rotor is made at least partially of stainless steel or titanium alloy or nickel-based alloy.

9. The turbomolecular vacuum pump according to claim 1, wherein the rotor is made by interference-fitting at least one blade stage with hollow blades made by metal additive manufacturing onto the hub.

10. The turbomolecular vacuum pump according to claim 1, wherein the rotor is made by metal additive manufacturing of at least one blade stage with hollow blades on the hub.

11. The turbomolecular vacuum pump according to claim 1, wherein the rotor is made in one piece.

12. The turbomolecular vacuum pump according to claim 11, wherein the rotor is made entirely by metal additive manufacturing.

13. A turbomolecular vacuum pump, comprising:
   a stator and a rotor configured to rotate in the stator, the rotor comprising a hub and at least one blade stage comprising blades distributed regularly about the periphery of the hub,
   wherein the blades of at least one blade stage of the rotor are hollow,
   wherein a thickness of a respective skin of each of the hollow blades is equal to or less than 3 mm and equal to or greater than 0.2 mm.

\* \* \* \* \*